US012549886B2

(12) United States Patent
Namba et al.

(10) Patent No.: US 12,549,886 B2
(45) Date of Patent: Feb. 10, 2026

(54) INFORMATION PROCESSING APPARATUS AND INFORMATION PROCESSING METHOD

(71) Applicant: SONY GROUP CORPORATION, Tokyo (JP)

(72) Inventors: Ryuichi Namba, Tokyo (JP); Shogo Shinkai, Tokyo (JP); Yuji Tokozume, Tokyo (JP); Akihiro Ito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 88 days.

(21) Appl. No.: 18/555,947

(22) PCT Filed: Feb. 1, 2022

(86) PCT No.: PCT/JP2022/003723
§ 371 (c)(1),
(2) Date: Oct. 18, 2023

(87) PCT Pub. No.: WO2022/230275
PCT Pub. Date: Nov. 3, 2022

(65) Prior Publication Data

US 2024/0205588 A1 Jun. 20, 2024

(30) Foreign Application Priority Data

Apr. 30, 2021 (JP) ................................ 2021-077583

(51) Int. Cl.
*H04R 3/04* (2006.01)
*H04R 1/10* (2006.01)
*H04R 3/00* (2006.01)
*H04R 5/033* (2006.01)
*H04R 29/00* (2006.01)
*H04S 1/00* (2006.01)

(52) U.S. Cl.
CPC ......... *H04R 1/1083* (2013.01); *H04R 1/1041* (2013.01); *H04R 3/005* (2013.01);
(Continued)

(58) Field of Classification Search
CPC ... G10K 2210/12821; G10K 2210/108; G10K 2210/1081; G10K 11/178; H04R 1/1083;
(Continued)

(56) References Cited

U.S. PATENT DOCUMENTS 9,343,056 B1 * 5/2016 Goodwin ............. G10K 11/002
11,437,012 B2 * 9/2022 Chen ................ G10K 11/17854
(Continued)

FOREIGN PATENT DOCUMENTS

JP H11187479 A 7/1999
JP 2005020355 A 1/2005
(Continued)

OTHER PUBLICATIONS

International Search Report and Written Opinion of PCT Application No. PCT/JP2022/003723, issued on Mar. 22, 2022, 10 pages of ISRWO.

*Primary Examiner* — Xu Mei
(74) *Attorney, Agent, or Firm* — CHIP LAW GROUP

(57) ABSTRACT

Provided are to an information processing apparatus and an information processing method which enable predetermined signal processing such as noise canceling to be appropriately executed on an audio signal while reducing an influence of a wind sound. The information processing apparatus includes a signal processing unit that executes the signal processing on a left ear audio signal and a right ear audio signal, and a wind sound reduction control unit that controls wind sound reduction processing of reducing the influence of the wind sound in the signal processing on the basis of a detection result of the wind sound based on a left ear sound collection signal collected near a left ear of a user and a detection result of the wind sound based on a right ear sound collection signal collected near a right ear of the user.

19 Claims, 7 Drawing Sheets

(52) U.S. Cl.
CPC ............... *H04R 3/04* (2013.01); *H04R 5/033* (2013.01); *H04S 1/007* (2013.01); *H04R 2410/01* (2013.01); *H04R 2410/07* (2013.01); *H04R 2460/01* (2013.01)

(58) Field of Classification Search
CPC ........ H04R 1/1041; H04R 3/005; H04R 3/04; H04R 5/033; H04R 2410/01; H04R 2410/07; H04R 2460/01; H04S 1/007
USPC .............................................. 381/71.6, 71.14
See application file for complete search history.

(56) References Cited

U.S. PATENT DOCUMENTS

| | | | | |
|---|---|---|---|---|
| 12,057,099 | B1 * | 8/2024 | Shields | G10K 11/17879 |
| 2007/0058822 | A1 * | 3/2007 | Ozawa | H04S 1/00 381/94.1 |
| 2014/0161271 | A1 * | 6/2014 | Teranishi | H04R 5/04 381/71.7 |
| 2017/0133000 | A1 * | 5/2017 | Hendrix | G10K 11/17854 |
| 2019/0069074 | A1 * | 2/2019 | Yamkovoy | G10K 11/17823 |
| 2019/0387306 | A1 * | 12/2019 | He | H04R 1/1083 |

FOREIGN PATENT DOCUMENTS

| | | | |
|---|---|---|---|
| JP | 2008-060759 | A | 3/2008 |
| JP | 2008-227595 | A | 9/2008 |
| JP | 2012-533244 | A | 12/2012 |
| JP | 2015185904 | A | 10/2015 |
| JP | 2016-039521 | A | 3/2016 |
| JP | 2017-518522 | A | 7/2017 |
| JP | 2018-163304 | A | 10/2018 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2022/003723 filed on Feb. 1, 2022, which claims priority benefit of Japanese Patent Application No. JP 2021-077583 filed in the Japan Patent Office on Apr. 30, 2021. Each of the above-referenced applications is hereby incorporated herein by reference in its entirety.

TECHNICAL FIELD

The present technology relates to an information processing apparatus, an information processing method, and a program, and more particularly, to an information processing apparatus, an information processing method, and a program which enable predetermined signal processing to be appropriately executed on an audio signal while reducing an influence of a wind sound.

BACKGROUND ART

Conventionally, there is proposed a noise canceling headphone that attenuates a cancellation noise signal for canceling environmental noise in a case where the environmental noise exceeds a certain level due to a sudden change in atmospheric pressure caused by a gust or the like and the environmental noise cannot be canceled (see, for example, Patent Document 1).

CITATION LIST

Patent Document

Patent Document 1: Japanese Patent Application Laid-Open No. 2008-60759

SUMMARY OF THE INVENTION

Problems to be Solved by the Invention

However, in the invention described in Patent Document 1, the cancellation noise signal is attenuated even in a case where the environmental noise exceeds the certain level due to a factor other than a wind sound, so that noise canceling performance is deteriorated.

The present technology has been made in view of such a situation, and enables predetermined signal processing such as noise canceling to be appropriately executed on an audio signal while reducing an influence of a wind sound.

Solutions to Problems

An information processing apparatus according to a first aspect of the present technology includes: a signal processing unit that executes signal processing on a left ear audio signal and a right ear audio signal; and a wind sound reduction control unit that controls wind sound reduction processing of reducing an influence of a wind sound in the signal processing on the basis of a detection result of the wind sound based on a left ear sound collection signal collected near a left ear of a user and a detection result of the wind sound based on a right ear sound collection signal collected near a right ear of the user.

An information processing method according to a first aspect of the present technology includes: executing signal processing on a left ear audio signal and a right ear audio signal; and controlling wind sound reduction processing of reducing an influence of a wind sound in the signal processing on the basis of a detection result of the wind sound based on a left ear sound collection signal collected near a left ear of a user and a detection result of the wind sound based on a right ear sound collection signal collected near a right ear of the user.

A program according to a first aspect of the present technology causes a computer to execute processing of: executing signal processing on a left ear audio signal and a right ear audio signal; and controlling wind sound reduction processing of reducing an influence of a wind sound in the signal processing on the basis of a detection result of the wind sound based on a left ear sound collection signal collected near a left ear of a user and a detection result of the wind sound based on a right ear sound collection signal collected near a right ear of the user.

In the first aspect of the present technology, the signal processing is executed on the left ear audio signal and the right ear audio signal; and the wind sound reduction processing of reducing the influence of the wind sound in the signal processing is controlled on the basis of the detection result of the wind sound based on the left ear sound collection signal collected near the left ear of the user and the detection result of the wind sound based on the right ear sound collection signal collected near the right ear of the user.

An information processing apparatus according to a second aspect of the present technology includes: a signal processing unit that executes predetermined signal processing on an audio signal for one ear of a left ear and a right ear; and a wind sound reduction control unit that controls wind sound reduction processing of reducing an influence of a wind sound in the signal processing on the basis of a detection result of the wind sound based on a sound collection signal collected near the one ear.

In the second aspect of the present technology, the predetermined signal processing is executed on the audio signal for one ear of the left ear and the right ear, and the wind sound reduction processing of reducing the influence of the wind sound in the signal processing is controlled on the basis of the detection result of the wind sound based on the sound collection signal collected near the one ear.

MODE FOR CARRYING OUT THE INVENTION

Hereinafter, a mode for carrying out the present technology will be described. Note that the description will be given in the following order.

1. Embodiment
2. Modified Examples
3. Others

1. Embodiment

An embodiment of the present technology will be described with reference to FIGS. 1 to 7.

Configuration Example of Information Processing Apparatus

Figure 1:
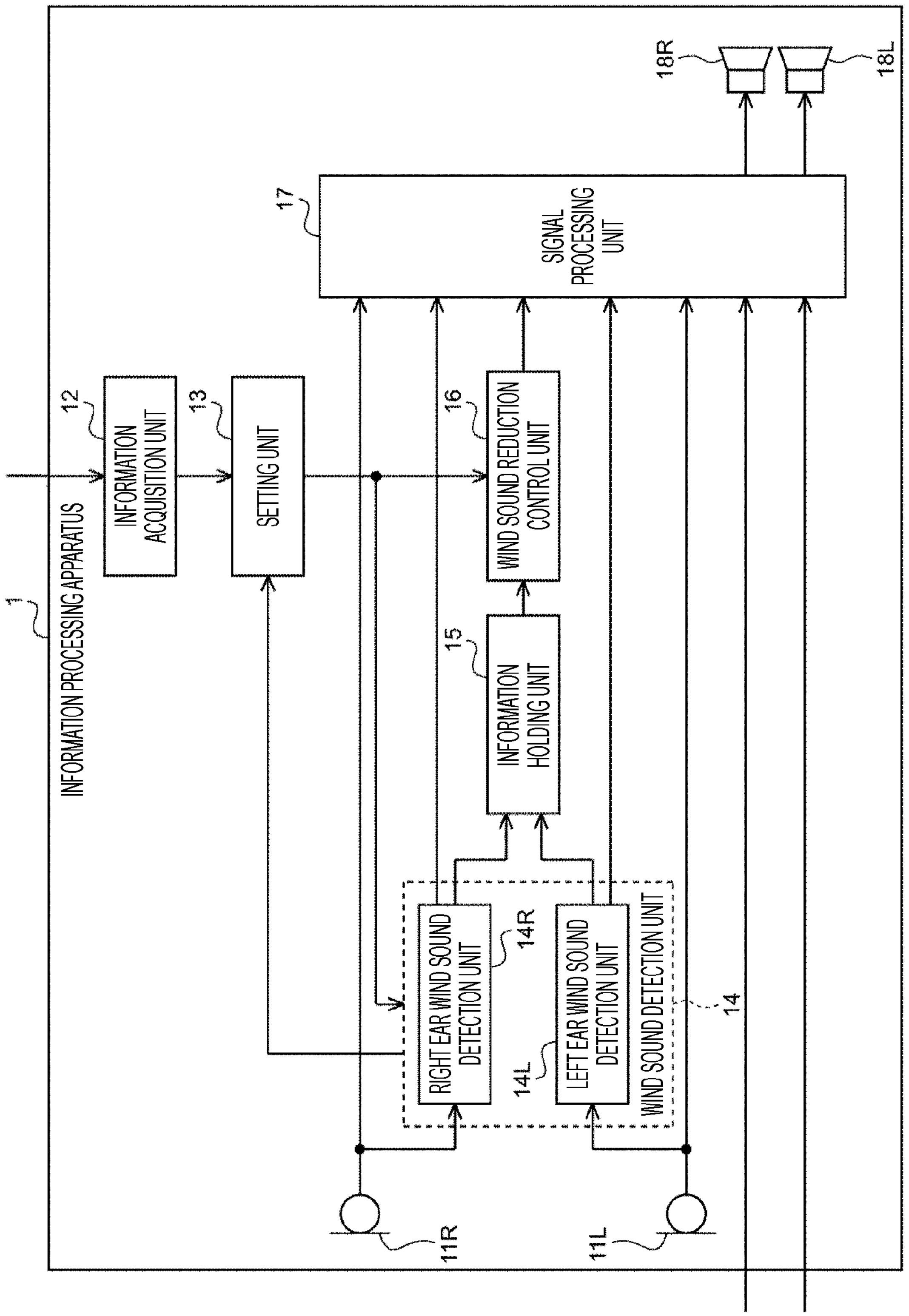
FIG. 1 is a block diagram illustrating an embodiment of an information processing apparatus to which the present technology is applied.

FIG. 1 illustrates an embodiment of an information processing apparatus 1 to which the present technology is applied.

The information processing apparatus 1 is configured using, for example, a headphone and is worn on right and left ears of a user.

The information processing apparatus 1 has a function of executing signal processing such as noise canceling, external sound pickup, noise reduction, and beamforming. Furthermore, the information processing apparatus 1 has a wind sound reduction function. The wind sound reduction function is a function of executing wind sound reduction processing for reducing an influence of a wind sound in the above-described signal processing by controlling an operation of the above-described signal processing according to the detected wind sound.

The information processing apparatus 1 includes a left ear sound collection unit 11L, a right ear sound collection unit 11R, an information acquisition unit 12, a setting unit 13, a wind sound detection unit 14, an information holding unit 15, a wind sound reduction control unit 16, a signal processing unit 17, a left ear output unit 18L, and a right ear output unit 18R. The wind sound detection unit 14 includes, for example, a left ear wind sound detection unit 14L and a right ear wind sound detection unit 14R.

The left ear sound collection unit 11L includes one or a plurality of microphones, an analog digital (AD) converter, and a peripheral circuit. The microphone is installed, for example, on a casing (for example, a housing) worn on the left ear of the user. The left ear sound collection unit 11L collects a sound near the left ear of the user by the microphone and generates an analog left ear sound collection signal. The left ear sound collection unit 11L performs AD conversion on the left ear sound collection signal by the AD converter, and supplies a digital left ear sound collection signal to the left ear wind sound detection unit 14L and the signal processing unit 17.

The right ear sound collection unit 11R includes one or a plurality of microphones, an analog digital (AD) converter, and a peripheral circuit. The microphone is installed, for example, on a casing (for example, a housing) worn on the right ear of the user. The right ear sound collection unit 11R collects a sound near the right ear of the user by the microphone and generates an analog right ear sound collection signal. The right ear sound collection unit 11R performs AD conversion on the right ear sound collection signal by the AD converter, and supplies a digital right ear sound collection signal to the right ear wind sound detection unit 14R and the signal processing unit 17.

Note that the number and positions of the microphones included in the left ear sound collection unit 11L and the number and positions of the microphones included in the right ear sound collection unit 11R are not necessarily symmetrical. For example, the number of the microphones may be different or installation positions of the microphones may be different between the left ear sound collection unit 11L and the right ear sound collection unit 11R.

The information acquisition unit 12 acquires external information including various types of information used for setting the wind sound reduction function from, for example, a device built in the information processing apparatus 1 or an external device, and supplies the external information to the setting unit 13.

Here, for example, a smartphone, a personal computer (PC), a music reproducing device, or the like is assumed as the external device, and is connected to the information processing apparatus 1 by wireless connection or wired connection. Alternatively, for example, a server or the like used for cloud computing is assumed as the external device, and is connected to the information processing apparatus 1 via a network.

The external information includes, for example, information used for predicting a wind sound situation around the information processing apparatus 1. For example, the external information includes position information indicating a current position of the information processing apparatus 1, environmental information indicating a use environment of the information processing apparatus 1, a weather forecast, and the like. The environment information includes, for example, information of the interior, the exterior, and the like. The weather forecast includes, for example, information such as weather, temperature, humidity, strength and an orientation of wind, and the like. As the wind sound situation to be predicted, for example, the presence or absence of a wind sound, power (magnitude), an orientation, and the like are assumed.

Furthermore, the information acquisition unit 12 acquires input information input by the user from, for example, the device built in the information processing apparatus 1 or the external device, and supplies the input information to the setting unit 13. The input information includes, for example, information regarding the setting of the wind sound reduction function.

The setting unit 13 performs the setting regarding the wind sound reduction function on the basis of at least one of the external information and the input information supplied from the information acquisition unit 12 or detection results of the wind sound obtained by the left ear wind sound detection unit 14L and the right ear wind sound detection unit 14R. The setting unit 13 supplies setting information regarding the setting of the wind sound reduction function to the left ear wind sound detection unit 14L, the right ear wind sound detection unit 14R, and the wind sound reduction control unit 16.

The left ear wind sound detection unit 14L performs processing of detecting the wind sound near the left ear of the user on the basis of a left ear wind sound detection signal and the setting information acquired from the setting unit 13 independently of the right ear wind sound detection unit 14R. The left ear wind sound detection unit 14L supplies information (hereinafter, referred to as left ear wind sound detection information) indicating the detection result of the wind sound to the setting unit 13, the information holding unit 15, and the signal processing unit 17.

The right ear wind sound detection unit 14R performs processing of detecting the wind sound near the right ear of the user on the basis of a right ear wind sound detection signal and the setting information acquired from the setting unit 13 independently of the left ear wind sound detection unit 14L. The right ear wind sound detection unit 14R supplies information (hereinafter, referred to as right ear wind sound detection information) indicating the detection result of the wind sound to the setting unit 13, the information holding unit 15, and the signal processing unit 17.

The information holding unit 15 temporarily holds the left ear wind sound detection information and the right ear wind sound detection information.

The wind sound reduction control unit 16 sets a content of an operation of the wind sound reduction processing on the basis of the left ear wind sound detection information and the right ear wind sound detection information held in the information holding unit 15 and the setting information acquired from the setting unit 13. The wind sound reduction control unit 16 supplies an operation parameter indicating the content of the operation of the wind sound reduction processing to the signal processing unit 17 to control the operation of the wind sound reduction processing executed by the signal processing unit 17. The wind sound reduction control unit 16 substantially controls the operation of the signal processing executed by the signal processing unit 17 by controlling the operation of the wind sound reduction processing executed by the signal processing unit 17.

The signal processing unit 17 acquires, from the external device, a left ear reproduction signal that is an audio signal corresponding to a sound input to the left ear of the user and a right ear reproduction signal that is an audio signal corresponding to a sound input to the right ear of the user. The signal processing unit 17 executes the above-described signal processing on the left ear reproduction signal and the right ear reproduction signal on the basis of the left ear sound collection signal and the right ear sound collection signal. At this time, the signal processing unit 17 executes the wind sound reduction processing by changing on/off, an intensity, and the like of the signal processing under the control of the wind sound reduction control unit 16 (on the basis of the operation parameter supplied from the wind sound reduction control unit 16).

The signal processing unit 17 supplies the left ear reproduction signal after the signal processing to the left ear output unit 18L as a left ear output signal. Note that, in a case where the signal processing is not performed, the signal processing unit 17 supplies the left ear reproduction signal as it is to the left ear output unit 18L as the left ear output signal. Similarly, the signal processing unit 17 supplies the right ear reproduction signal after the signal processing to the right ear output unit 18R as a right ear output signal. Note that, in a case where the signal processing is not performed, the signal processing unit 17 supplies the right ear reproduction signal as it is to the right ear output unit 18R as the right ear output signal.

The left ear output unit 18L reproduces the left ear output signal and outputs a sound on the basis of the left ear output signal.

The right ear output unit 18R reproduces the right ear output signal and outputs a sound on the basis of the right ear output signal.

Wind Sound Reduction Setting Processing

Next, wind sound reduction setting processing executed by the information processing apparatus 1 will be described with reference to a flowchart of FIG. 2.

This processing starts, for example, when power of the information processing apparatus 1 is turned on, and ends when the power of the information processing apparatus 1 is turned off.

In step S1, the left ear wind sound detection unit 14L and the right ear wind sound detection unit 14R determine whether or not the wind sound reduction function is set to on. In a case where it is determined that the wind sound reduction function is set to on, the processing proceeds to step S2.

In step S2, the information processing apparatus 1 executes wind sound detection processing.

Specifically, the left ear sound collection unit 11L collects a sound near a left ear of a user, generates a left ear sound collection signal, and supplies the left ear sound collection signal to the left ear wind sound detection unit 14L and the signal processing unit 17.

The left ear wind sound detection unit 14L divides the left ear sound collection signal for each predetermined time length and executes the wind sound detection processing for each divided frame. Here, the left ear sound collection signal includes various environmental sounds according to a use environment of the information processing apparatus 1, a human voice, a wind sound, and the like. On the other hand, the wind sound has features that are not seen in the other sounds. For example, variations in a specific frequency characteristic and power over time appear in the wind sound. Furthermore, for example, the wind sound has non-stationary properties in a time direction and a space direction.

The left ear wind sound detection unit 14L detects the presence or absence of the wind sound for each frame of the left ear sound collection signal on the basis of these features of the wind sound. For example, the left ear wind sound detection unit 14L extracts one or a plurality of features representing the above-described wind sound likeliness from a frame that is a target of the left ear sound collection signal. The left ear wind sound detection unit 14L uses any of an extracted feature, a weighted addition value of the extracted feature, or an output value, obtained by inputting the extracted feature or the weighted addition value of the extracted feature to a non-linear activation function, as a determination value, and determines that the wind sound is included in the frame in a case where the determination value is equal to or more than a predetermined threshold. On the other hand, in a case where the determination value is less than the predetermined threshold, the left ear wind sound detection unit 14L determines that no wind sound is included in the frame.

Figure 3:
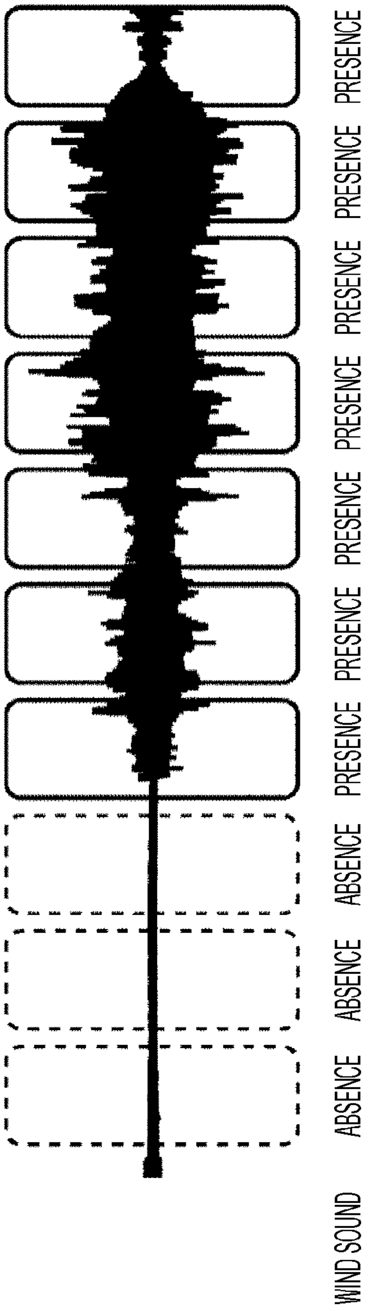
FIG. 3 is a view illustrating an example of a wind sound detection result.

FIG. 3 illustrates an example of a wind sound detection result. The horizontal axis in FIG. 3 represents time, and a waveform of a left ear sound collection signal is illustrated. Furthermore, a rectangular frame indicates a frame, a solid-line frame indicates a frame in which the wind sound has been detected, and a dotted-line frame indicates a frame in which the wind sound has not been detected.

Note that, in a case where the left ear sound collection unit 11L includes a plurality of microphones and outputs a plurality of left ear sound collection signals collected by the microphones, for example, the left ear wind sound detection unit 14L extracts one or a plurality of features representing the above-described wind sound likeness from a target frame for each of the left ear sound collection signals. At this time, the left ear wind sound detection unit 14L may additionally use a feature (for example, cross-correlation of each of the left ear sound collection signals) using each of the left ear sound collection signals in order to capture a spatially non-stationary property of a wind sound. Then, for example, the left ear wind sound detection unit 14L uses any of a weighted addition value of the extracted feature and an output value obtained by inputting the extracted feature or the weighted addition value of the extracted feature to the non-linear activation function as a determination value, and detects the presence or absence of the wind sound on the basis of the determination value.

Note that a weight of the weighted addition is set on the basis of, for example, a position of the microphone or the like, or set on the basis of learning in advance.

Furthermore, the left ear wind sound detection unit 14L detects accompanying information for each frame of the left ear sound collection signal as necessary. The accompanying information includes, for example, power of the wind sound to be estimated, power of a component other than the wind sound, and the like.

The left ear wind sound detection unit 14L generates left ear wind sound detection information including information indicating the presence or absence of the wind sound in the target frame and the accompanying information. Note that the information indicating the presence or absence of the wind sound is indicated by, for example, a binary value of 1 (presence of the wind sound) or 0 (absence of the wind sound), or a continuous value from 0 (possibility 0%) to 1 (possibility 100%) indicating the possibility of inclusion of the wind sound. The left ear wind sound detection unit 14L supplies the left ear wind sound detection information to the information holding unit 15.

Similarly, the right ear sound collection unit 11R collects a sound near a right ear of the user, generates a right ear sound collection signal, and supplies the right ear sound collection signal to the right ear wind sound detection unit 14R and the signal processing unit 17. The right ear wind sound detection unit 14R executes wind sound detection processing on the basis of the right ear wind sound signal, generates right ear wind sound detection information, and supplies the right ear wind sound detection information to the information holding unit 15.

Note that the left ear wind sound detection unit 14L and the right ear wind sound detection unit 14R may execute the wind sound detection processing directly from the sound collection signals using a deep neural network (DNN) or the like without extracting the features of the sound collection signals, for example.

The information holding unit 15 holds the left ear wind sound detection information and the right ear wind sound detection information corresponding to a predetermined number of latest frames. Furthermore, the information holding unit 15 appropriately deletes the left ear wind sound detection information and the right ear wind sound detection information earlier than the predetermined number of frames.

In step S3, the wind sound reduction control unit 16 sets a content of an operation of the wind sound reduction processing. Specifically, the wind sound reduction control unit 16 integrates the left ear wind sound detection information and the right ear wind sound detection information held in the information holding unit 15, and sets the content of the operation of wind sound reduction processing on the basis of the integrated information and setting information acquired from the setting unit 13.

Note that the setting information is generated by the setting unit 13, for example, in a process of step S7 described later and supplied to the wind sound reduction control unit 16. The setting information includes, for example, on/off, an intensity, a sensitivity, and a transition time of the wind sound reduction function.

For example, the sensitivity of the wind sound reduction function is defined by the number of frames (hereinafter, referred to as an activation number of frames) as a condition for activating the wind sound reduction processing. For example, in a case where the number of frames in which the wind sound has been detected in both the left ear and the right ear becomes equal to or more than the activation number of frames within a period of a predetermined number of frames, the wind sound reduction processing is started. For example, as the activation number of frames decreases, the sensitivity of the wind sound reduction function increases, and the wind sound reduction processing is easily activated. That is, a timing at which the wind sound reduction processing is activated is advanced. On the other hand, as the activation number of frames increases, the sensitivity of the wind sound reduction function decreases, and the wind sound reduction processing is less likely to be activated. That is, the timing at which the wind sound reduction processing is activated is delayed.

For example, the transition time of the wind sound reduction function indicate a transition time until an intensity of the wind sound reduction processing reaches a set value when the wind sound reduction processing is activated, and a transition time until the intensity of the wind sound reduction processing reaches 0 when the wind sound reduction processing is stopped. The transition time of the wind sound reduction function is defined by, for example, a time constant representing a change rate of the intensity of the wind sound reduction processing. Then, the wind sound reduction control unit 16 controls the change rate of the intensity of the wind sound reduction processing on the basis of the transition time of the wind sound reduction function.

For example, the wind sound reduction control unit 16 sets the wind sound reduction processing to on in a frame in which the wind sound is detected in both the left ear and the right ear. On the other hand, the wind sound reduction control unit 16 sets the wind sound reduction processing to off in a frame in which the wind sound is not detected in at least one of the left ear or the right ear.

Figure 4:
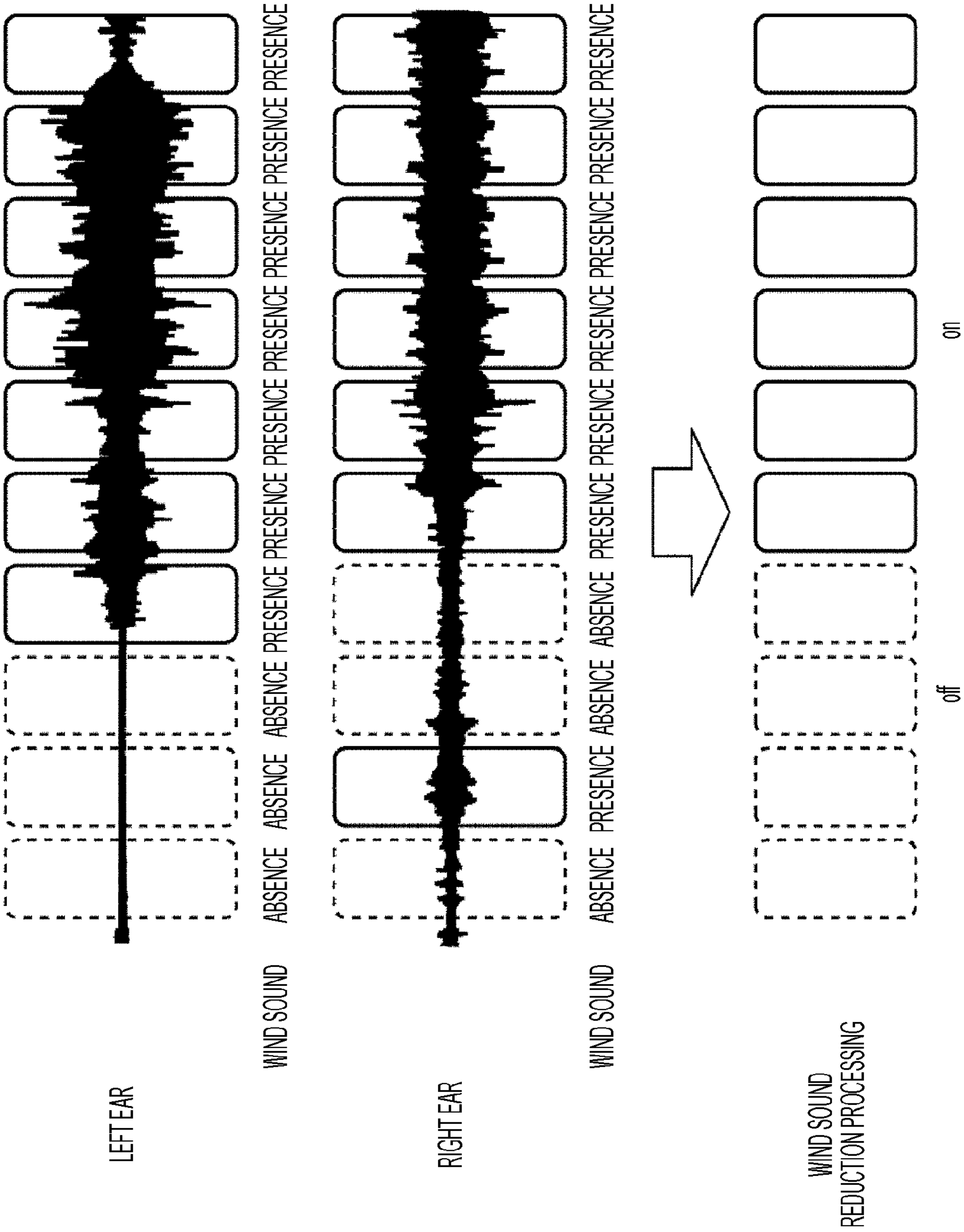
FIG. 4 is a view illustrating a setting example of on/off of wind sound reduction processing.

FIG. 4 illustrates a setting example of the content of the operation of the wind sound reduction processing. The first row of FIG. 4 is a view similar to FIG. 3, and illustrates an example of a detection result of the wind sound near the left ear. The second row of FIG. 4 is a view similar to FIG. 3, and illustrates an example of a detection result of the wind sound near the right ear. The third row of FIG. 4 illustrates a set content of the operation of the wind sound reduction processing. A frame indicated by a solid-line frame indicates a frame in which the wind sound reduction processing is set to on, and a frame indicated by a dotted-line frame indicates a frame in which the wind sound reduction processing is set to off.

In this example, the wind sound has not been detected in at least one of the left ear or the right ear from the first frame to the fourth frame, and thus, the wind sound reduction processing has been set to off. On the other hand, the wind sound has been detected in both the left ear and the right ear from the fifth frame to the tenth frame, the wind sound reduction processing has been set to on.

At this time, for example, the wind sound reduction control unit 16 may adjust a timing to activate the wind sound reduction processing, that is, a frame in which the wind sound reduction processing is set to on, on the basis of a set value of the sensitivity of the wind sound reduction function.

Furthermore, for example, the wind sound reduction control unit 16 may set the intensity of the wind sound reduction processing for each frame on the basis of at least one of a set value of the intensity of the wind sound setting function, a set value of the transition time, or power of the detected wind sound. The intensity of the wind sound reduction processing is represented by, for example, a continuous value from 0 (off) to 1 (maximum). For example, the wind sound reduction control unit 16 increases the intensity of the wind sound reduction processing as the power of the wind sound increases, and decreases the intensity of the wind sound reduction processing as the power of the wind sound decreases.

Note that it is desirable that timings to set the wind sound reduction processing on and off be synchronized between the right and left. On the other hand, the intensity of the wind sound reduction processing does not necessarily need to be matched between the right and left. For example, in a case where the power of the wind sound near the left ear and the power of the wind sound near the right ear are different, the intensity of the wind sound reduction processing for the left ear reproduction signal and the intensity of the wind sound reduction processing for the right ear reproduction signal may be set to different values.

The wind sound reduction control unit 16 generates an operation parameter indicating the content of the operation of the wind sound reduction processing and supplies the operation parameter to the signal processing unit 17. The operation parameter includes, for example, a parameter indicating on/off of the wind sound reduction processing for each frame, and includes a parameter indicating the wind sound reduction processing for each frame as necessary.

In step S4, the setting unit 13 determines whether or not the wind sound is being generated. For example, in a case where the wind sound has not been detected for a predetermined number of frames, the left ear wind sound detection unit 14L notifies the setting unit 13 that the wind sound has not been detected. Similarly, the right ear wind sound detection unit 14R notifies the setting unit 13 that the wind sound has not been detected in a case where the wind sound has not been detected for the predetermined number of frames.

In a case where both the left ear wind sound detection unit 14L and the right ear wind sound detection unit 14R provide notification that the wind sound has not been detected, the setting unit 13 determines that the wind sound is not being generated, and the processing proceeds to step S5.

In step S5, the setting unit 13 sets the wind sound reduction function to off. The setting unit 13 notifies the left ear wind sound detection unit 14L, the right ear wind sound detection unit 14R, and the wind sound reduction control unit 16 that the wind sound reduction function is set to off.

Thereafter, the processing proceeds to step S6.

On the other hand, in step S4, in a case where at least one of the left ear wind sound detection unit 14L or the right ear wind sound detection unit 14R does not provide notification that the wind sound has not been detected, the setting unit 13 determines that the wind sound is being generated, the process of step S5 is skipped, and the processing proceeds to step S6.

Furthermore, in a case where it is determined that the wind sound reduction function is set to off, the processes of steps S2 to S5 are skipped, and the processing proceeds to step S6.

In step S6, the setting unit 13 determines whether or not to change the setting of the wind sound reduction function. For example, in a case where the external information is supplied from the information acquisition unit 12, the setting unit 13 predicts whether or not a wind sound situation around the information processing apparatus 1 changes on the basis of the position information, the environment information, the weather forecast, and the like included in the external information. In a case where the setting unit 13 predicts that the wind sound situation around the information processing apparatus 1 changes, the setting unit determines to change the setting of the wind sound reduction function, and the processing proceeds to step S7.

Furthermore, for example, in a case where the input information is supplied from the information acquisition unit 12, when the input information includes information regarding a change of the setting of the wind sound reduction function, the setting unit 13 determines to change the setting of the wind sound reduction function, and the processing proceeds to step S7.

In step S7, the setting unit 13 changes the setting of the wind sound reduction function. For example, in a case where it has been predicted that the wind sound situation around the information processing apparatus 1 changes, the setting unit 13 changes at least one of the on/off, the intensity, the sensitivity, or the transition time of the wind sound reduction function on the basis of the predicted wind sound situation.

The setting unit 13 sets the wind sound reduction function to off, for example, in a case where it is predicted that no wind sound is generated since a place where the information processing apparatus 1 is present is the interior, the inside of a mobile body (for example, the inside of a vehicle, the inside of a train, or the like), or the like. On the other hand, the setting unit 13 sets the wind sound reduction function to on in a case where it is predicted that the wind sound is generated since the place where the information processing apparatus 1 is present is the exterior or the like.

For example, the setting unit 13 increases the intensity of the wind sound reduction function in a case where a strong wind is predicted in the place where the information processing apparatus 1 is present, and decreases the intensity of the wind sound reduction function in a case where a weak wind is predicted in the place where the information processing apparatus 1 is present.

For example, in a case where it is predicted that the weather will be inclement in the place where the information processing apparatus 1 is present, the setting unit 13 lowers the sensitivity of the wind sound reduction function since it is predicted that strength and an orientation of a wind will greatly vary. On the other hand, in a case where it is predicted that the weather will be stable in the place where the information processing apparatus 1 is present, the setting unit 13 raises the sensitivity of the wind sound reduction function since it is predicted that the strength and orientation of the wind do not greatly vary.

Furthermore, for example, the setting unit 13 changes at least one of the on/off, the intensity, the sensitivity, or the transition time of the wind sound reduction function on the basis of the information regarding the change of the setting of the wind sound reduction function included in the input information acquired from the information acquisition unit 12. Therefore, the user can freely change the setting of the wind sound reduction function.

Figure 5:
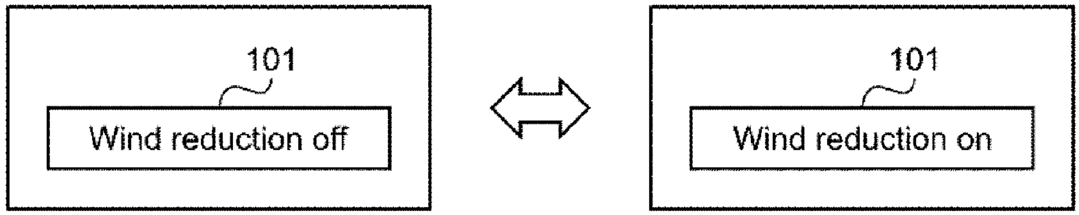
FIG. 5 is a view illustrating an example of a setting screen of a wind sound reduction function.
Figure 6:
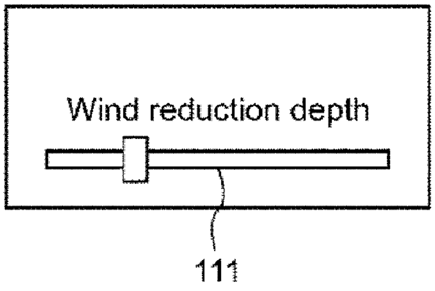
FIG. 6 is a view illustrating an example of the setting screen of the wind sound reduction function.

FIGS. 5 and 6 illustrate examples of a setting screen of the wind sound reduction function displayed on the external device.

On the setting screen of FIG. 5, the user can switch on/off of the wind sound reduction function by pressing a button 101.

On the setting screen of FIG. 6, the user can change the intensity (depth) of the wind sound setting function by moving a position of a scale of a slider 111 to the right and left.

The setting unit 13 supplies setting information regarding the setting of the wind sound reduction function to the left ear wind sound detection unit 14L, the right ear wind sound detection unit 14R, and the wind sound reduction control unit 16.

Thereafter, the processing returns to step S1, and the processing in and after step S1 is executed.

On the other hand, in a case where it is determined in step S6 not to change the setting of the wind sound reduction function, the processing returns to step S1, and the processing in and after step S1 is executed.

Signal Processing and Output Processing

Figure 7:
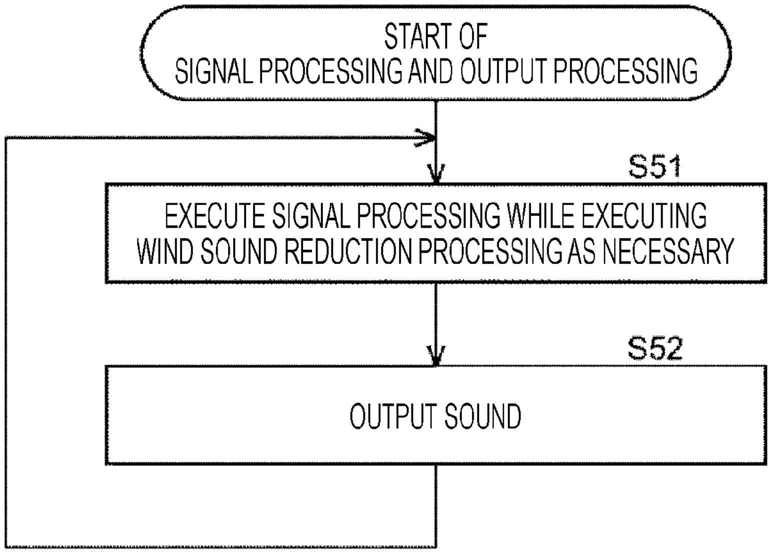
FIG. 7 is a flowchart for describing signal processing and output processing.

Next, signal processing and output processing executed by the information processing apparatus 1 in correspondence to the wind sound reduction setting processing of FIG. 2 will be described with reference to a flowchart of FIG. 7.

This processing starts, for example, when power of the information processing apparatus 1 is turned on, and ends when the power of the information processing apparatus 1 is turned off.

In step S51, the signal processing unit 17 executes the signal processing while executing the wind sound reduction processing as necessary.

For example, in a case where a noise canceling function is set to on, the signal processing unit 17 executes noise canceling as the signal processing. Specifically, the signal processing unit 17 executes processing of canceling noise, indicated by the left ear sound collection signal supplied from the left ear sound collection unit 11L, on the left ear reproduction signal input from the outside. Similarly, the signal processing unit 17 executes processing of canceling noise, indicated by the right ear sound collection signal supplied from the right ear sound collection unit 11R, on the right ear reproduction signal input from the outside.

Figure 2:
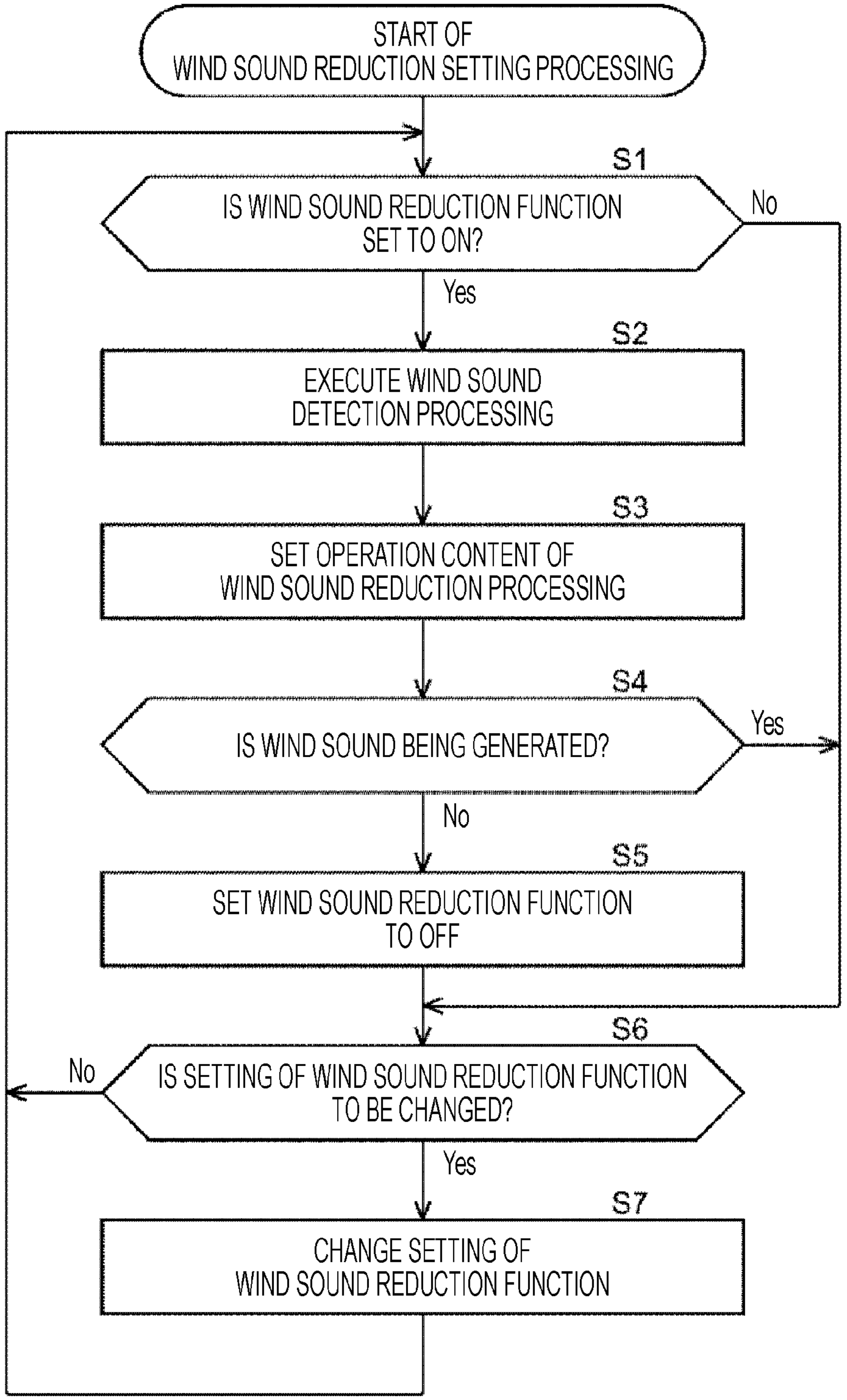
FIG. 2 is a flowchart for describing wind sound reduction setting processing.

At this time, the signal processing unit 17 executes the wind sound reduction processing on the basis of the operation parameter acquired from the wind sound reduction control unit 16 in the process in step S3 of FIG. 2 described above. Specifically, the signal processing unit 17 executes the noise canceling as usual in a frame in which the wind sound reduction processing is set to off.

On the other hand, the signal processing unit 17 executes the wind sound reduction processing by suppressing an operation of the noise canceling in a frame in which the wind sound reduction processing is set to on. For example, in a case where the intensity of the wind sound reduction processing is not particularly set, the signal processing unit 17 does not execute the noise canceling.

On the other hand, in a case where the intensity of the wind sound reduction processing is set, the signal processing unit 17 adjusts the intensity of the noise canceling on the basis of the intensity of the wind sound reduction processing. Specifically, the signal processing unit 17 decreases the intensity of the noise canceling for a frame with a higher intensity of the wind sound reduction processing increases. Therefore, an effect of the noise canceling decreases, but an effect of reducing an influence of the wind sound increases. On the other hand, the signal processing unit 17 increases the intensity of the noise canceling for a frame with a lower intensity of the wind sound reduction processing decreases. Therefore, the effect of reducing the influence of the wind sound decreases, but the effect of the noise canceling increases.

Furthermore, for example, in a case where an external sound pickup function is set to on, the signal processing unit 17 executes external sound pickup processing as the signal processing.

Here, the external sound pickup function is processing of allowing the user to listen to a surrounding sound while listening to a reproduced sound by superimposing an external sound on the reproduced sound.

For example, the signal processing unit 17 performs processing of superimposing the left ear sound collection signal supplied from the left ear sound collection unit 11L on the left ear reproduction signal input from the outside. Similarly, the signal processing unit 17 performs processing of superimposing the right ear sound collection signal supplied from the right ear sound collection unit 11R on the right ear reproduction signal input from the outside.

At this time, the signal processing unit 17 executes the wind sound reduction processing on the basis of the operation parameter acquired from the wind sound reduction control unit 16 in the process in step S3 of FIG. 2 described above. Specifically, the signal processing unit 17 executes the external sound pickup processing as usual in a frame in which the wind sound reduction processing is set to off.

On the other hand, the signal processing unit 17 executes the wind sound reduction processing by suppressing an operation of the external sound pickup processing in a frame in which the wind sound reduction processing is set to on. For example, in a case where the intensity of the wind sound reduction processing is not particularly set, the signal processing unit 17 does not execute the external sound pickup processing.

On the other hand, for example, in a case where the intensity of the wind sound reduction processing is set, the signal processing unit 17 adjusts an external sound mixing ratio of the external sound pickup processing on the basis of the intensity of the wind sound reduction processing.

Here, the external sound mixing ratio is a ratio of mixing the external sound (left ear sound collection signal or right ear sound collection signal) with the reproduced sound (left ear reproduction signal or right ear reproduction signal). The volume of the external sound with respect to the reproduced sound increases as the external sound mixing ratio increases, and the volume of the external sound with respect to the reproduced sound decreases as the external sound mixing ratio decreases.

For example, the signal processing unit 17 decreases the external sound mixing ratio for a frame with a higher intensity of the wind sound reduction processing. Therefore, it is difficult to hear the external sound, but the effect of reducing the influence of the wind sound increases. On the other hand, the signal processing unit 17 decreases the external sound mixing ratio for a frame with a lower intensity of the wind sound reduction processing. Therefore, the effect of reducing the influence of the wind sound decreases, but the external sound is easily heard.

Note that, in a case where the external sound pickup processing is performed, there is a case where noise reduction or beamforming is executed on the external sound thus picked up. For example, there is a case where processing is executed to reduce vibration noise by cutting a low-frequency component of the external sound or to emphasize and pick up a sound coming from a specific direction for calling attention or the like.

In this case, for example, the signal processing unit 17 executes the noise reduction and beamforming as usual in a frame in which the wind sound reduction processing is set to off.

On the other hand, in a case where the external sound pickup processing is executed in a frame in which the wind sound reduction processing is set to on, the signal processing unit 17 executes the wind sound reduction processing by suppressing operations of the noise reduction and beamforming. For example, in a case where the intensity of the wind sound reduction processing is not particularly set, the signal processing unit 17 does not execute the noise reduction and beamforming.

On the other hand, in a case where the intensity of the wind sound reduction processing is set, the signal processing unit 17 adjusts intensities of the noise reduction and beamforming on the basis of the intensity of the wind sound reduction processing. Specifically, the signal processing unit 17 decreases the intensities of the noise reduction and beamforming for a frame with a higher intensity of the wind sound reduction processing increases. Therefore, effects of the noise reduction and beamforming decrease, but the effect of reducing the influence of the wind sound increases. On the other hand, the signal processing unit 17 increases the intensities of the noise reduction and beamforming for a frame with a lower intensity of the wind sound reduction processing decreases. Therefore, the effect of reducing the influence of the wind sound decreases, but the effects of the noise reduction and beamforming increase.

The signal processing unit 17 supplies the left ear reproduction signal after the signal processing to the left ear output unit 18L as a left ear output signal, and supplies the right ear reproduction signal after the signal processing to the right ear output unit 18R as a right ear output signal.

Note that, in a case where no signal processing is executed, the signal processing unit 17 supplies the left ear reproduction signal as it is to the left ear output unit 18L as the left ear output signal, and supplies the right ear reproduction signal as it is to the right ear output unit 18R as the right ear output signal.

In step S52, the left ear output unit 18L and the right ear output unit 18R output sounds. Specifically, the left ear output unit 18L reproduces the left ear output signal and outputs the sound on the basis of the left ear output signal. The right ear output unit 18R reproduces the right ear output signal and outputs a sound on the basis of the right ear output signal.

Thereafter, the processing returns to step S51, and the processing in and after step S51 is executed.

As described above, it is possible to appropriately execute the signal processing such as the noise canceling and the external sound pickup processing on an audio signal while reducing the influence of the wind sound. For example, since an operation of the signal processing is suppressed in a case where the wind sound is detected, it is suppressed that the signal processing is excessively executed on the wind sound to cause degradation in the sound quality. Furthermore, the wind sound reduction processing is executed only in a period in which the wind sound is detected in both the vicinity of the left ear and the vicinity of the right ear, and thus, it is possible to suppress an auditory deviation between left and right reproduced sounds. Therefore, it is suppressed that the user feels uncomfortable about the reproduced sounds after the signal processing.

Furthermore, the setting of the wind sound reduction function can be changed according to the predicted wind sound situation and a user setting. Therefore, for example, the wind sound reduction processing can be more appropriately executed according to the use environment (for example, a surrounding environmental sound or the like) and an individual difference of the user (for example, a difference in a size of a head, a shape of an auricle around the microphone, or the like).

2. Modified Examples

Hereinafter, modified examples of the above-described embodiment of the present technology will be described.

Modified Example Regarding Configuration of Information Processing Apparatus 1

For example, in a case where the information processing apparatus 1 is configured using wireless headphones or the like and is divided into a part for a left ear and a part for a right ear, the information acquisition unit 12, the setting unit 13, the information holding unit 15, the wind sound reduction control unit 16, and the signal processing unit 17 are arranged in one part. In this case, for example, the one part and the other part communicate with each other at a predetermined timing, so that necessary information is shared.

Note that, for example, the information holding unit 15 may be arranged in both the parts. In this case, the wind sound reduction control unit 16 arranged in the one part receives left ear wind sound detection information and right ear wind sound detection information from the information holding units 15 in both the parts.

Furthermore, for example, the signal processing unit 17 may be arranged in both the parts. In this case, the wind sound reduction control unit 16 arranged in the one part transmits an operation parameter of wind sound reduction processing to the signal processing units 17 arranged in both the parts.

Note that, for example, in a case where the information processing apparatus 1 is configured using a headphone including a headband section, the information acquisition unit 12, the setting unit 13, the information holding unit 15, the wind sound reduction control unit 16, and the signal processing unit 17, which are common to the right and left, can be provided in the headband section.

For example, the information acquisition unit 12 and the setting unit 13 are not necessarily provided, and wind sound reduction processing may always perform the same operation.

For example, the information acquisition unit 12, the setting unit 13, the information holding unit 15, and the wind sound reduction control unit 16 may be provided in an external device. As the external device, an information processing apparatus carried by a user such as a smartphone, a PC, or a music reproducing device, a server used for cloud computing, or the like is assumed.

Figure 8:
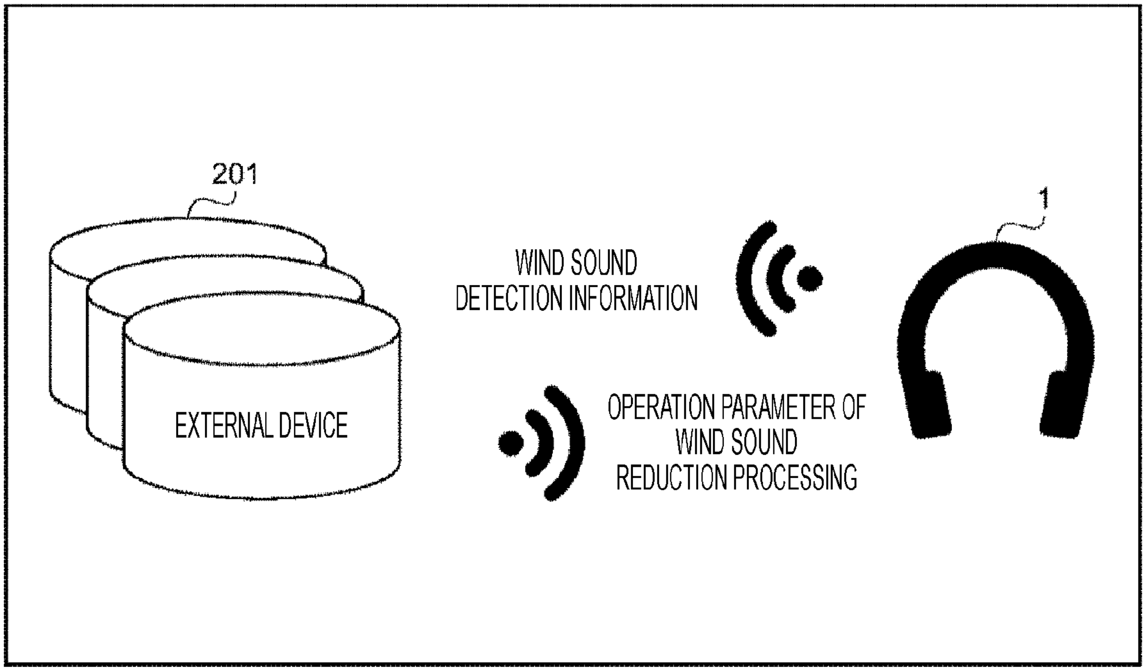
FIG. 8 is a view illustrating a modified example of a method for setting an operation parameter of the wind sound reduction processing.

In this case, for example, as illustrated in FIG. 8, the information processing apparatus 1 transmits wind sound detection information (left ear wind sound detection information and right ear wind sound detection information) to an external device 201. In this case, it is desirable to transmit the wind sound detection information that has been subjected to information compression in order to reduce a data transfer amount.

On the other hand, the external device 201 sets an operation parameter of the wind sound reduction processing on the basis of the received left ear wind sound detection information and right ear wind sound detection information, and transmits the operation parameter to the information processing apparatus 1.

Then, the information processing apparatus 1 executes the wind sound reduction processing using the received operation parameter.

Therefore, processing of the information processing apparatus 1 can be mitigated.

Note that, for example, the information processing apparatus 1 may extract feature amounts of the wind sound of a left ear and a right ear, transmit wind sound feature amount information indicating the extracted feature amounts to the external device 201, and the external device 201 may set an operation parameter of wind sound reduction processing on the basis of the wind sound feature amount information.

In this case, for example, the external device 201 may classify the wind sound into a plurality of types in advance and hold operation parameters for the wind sound types, respectively. Then, the external device 201 may identify a wind sound type on the basis of the received wind sound feature amount information, and transmit the operation parameter corresponding to the identified wind sound type to the information processing apparatus 1.

Furthermore, the left ear wind sound detection unit 14L and the right ear wind sound detection unit 14R may be further provided in the external device 201. In this case, the information processing apparatus 1 transmits a left ear sound collection signal and a right ear sound collection signal to the external device 201, and receives an operation parameter of wind sound reduction processing from the external device 201.

Moreover, for example, the setting unit 13 may be provided in an external device, and the external device may perform setting of the information processing apparatus 1. In this case, the external device implements the setting unit 13 by executing a predetermined application program.

Figure 9:
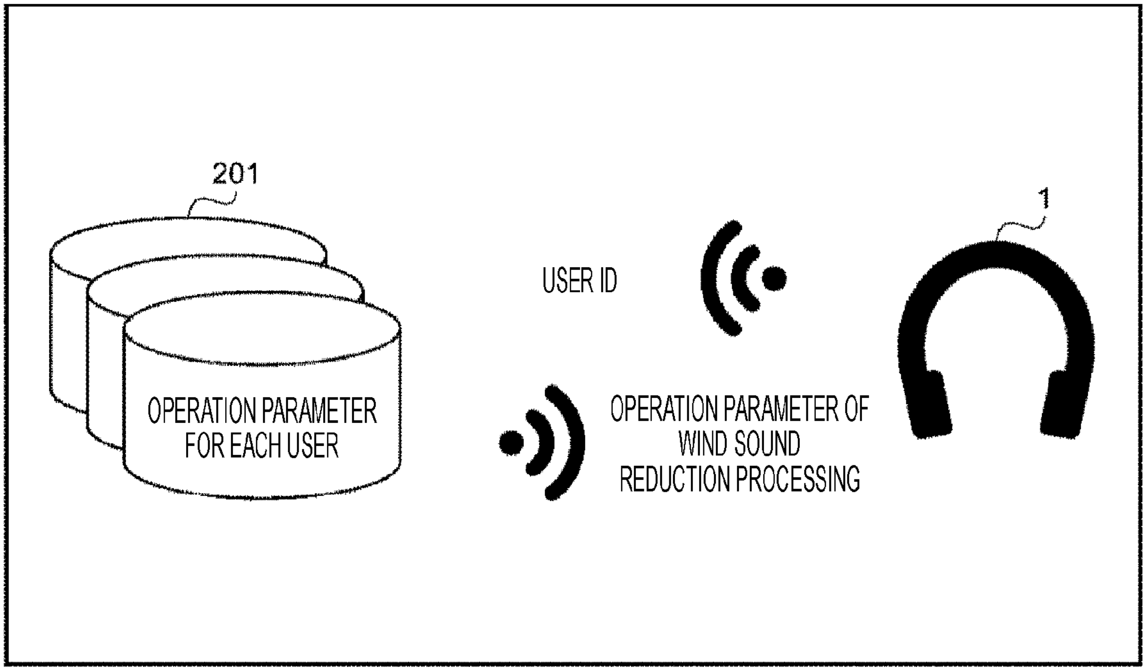
FIG. 9 is a view illustrating a modified example of the method for setting an operation parameter of the wind sound reduction processing.

Furthermore, for example, in a case where the external device 201 is configured using a server or the like, the external device 201 may accumulate an operation parameter of wind sound reduction processing for each user and provide the operation parameter to the information processing apparatus 1 as illustrated in FIG. 9.

Specifically, the external device 201 accumulates the operation parameters for the users in association with user IDs of the users, respectively. The operation parameter for each of the users is, for example, an operation parameter set by each of the users or an operation parameter set by the information processing apparatus 1 and uploaded to the external device 201.

Then, the information processing apparatus 1 transmits a user ID to the external device 201.

On the other hand, the external device 201 extracts an operation parameter associated with the received user ID and transmits the operation parameter to the information processing apparatus 1.

Then, the information processing apparatus 1 executes the wind sound reduction processing using the received operation parameter.

Therefore, for example, in a case where a user holds a plurality of types of the information processing apparatuses 1 (for example, a plurality of types of headphones), it is possible to automatically set an operation parameter suitable for the user to each of the information processing apparatuses 1.

Note that, for example, the external device 201 may accumulate operation parameter respectively for the types of the information processing apparatuses 1 for each user, and transmit an operation parameter corresponding to a combination of the user and the information processing apparatus 1 to the information processing apparatus 1. Therefore, a more appropriate operation parameter can be set in the information processing apparatus 1.

Furthermore, for example, the external device 201 may accumulate operation parameters respectively for wind sound types for each user and transmit an operation parameter corresponding to a combination of the user and the wind sound type to the information processing apparatus 1. Therefore, a more appropriate operation parameter can be set in the information processing apparatus 1.

Modified Examples Regarding Wind Sound Reduction Processing

For example, in a case where the information processing apparatus 1 operates with a battery, the operation of the wind sound reduction processing may be controlled on the basis of a remaining capacity of the battery.

For example, in a case where the left ear wind sound detection unit 14L and the right ear wind sound detection unit 14R are operated by different batteries (hereinafter, referred to as a left ear battery and a right ear battery), the operations of the left ear wind sound detection unit 14L and the right ear wind sound detection unit 14R may be controlled on the basis of remaining capacities of the left ear battery and the right ear battery, respectively.

Specifically, in a case where both the remaining capacities of the left ear battery and the right ear battery are equal to or more than a predetermined threshold, the above-described wind sound reduction processing is executed.

On the other hand, in a case where the remaining capacity of any one of the left ear battery and the right ear battery is less than the threshold, wind sound detection processing of one of the left ear wind sound detection unit 14L and the right ear wind sound detection unit 14R for which the remaining capacity of the battery is less than the threshold is stopped. In this case, for example, only the one wind sound detection unit 14 executes the wind sound detection processing, and the wind sound reduction processing is controlled on the basis of the detection result thereof.

Furthermore, for example, in a case where the remaining capacities of both the left ear battery and the right ear battery are less than the predetermined threshold, the left ear wind sound detection unit 14L and the right ear wind sound detection unit 14R stop the wind sound detection processing. Therefore, the wind sound reduction processing is stopped, the consumption of the left ear battery and the right ear battery is suppressed, and a usable time without charging the information processing apparatus 1 is extended.

Note that, for example, a user may be allowed to set the above-described threshold of the remaining capacity of the battery.

For example, wind sound reduction processing may be controlled for each of a plurality of frequency bands of an audio signal. Specifically, for example, wind sound detection processing is performed for each of the frequency bands, and an operation parameter of the wind sound reduction processing is set for each of the frequency bands. For example, for each of the frequency bands, on/off of the wind sound reduction processing is set, or an intensity of the wind sound reduction processing is set to a different value.

For example, in a case where at least one of the left ear sound collection unit 11L or the right ear sound collection unit 11R includes a plurality of microphones, wind sound reduction processing may be controlled for each of sound collection signals collected by the plurality of microphones. For example, in a case where noise canceling is performed on a left ear reproduction signal, an operation parameter may be set for each of sound collection signals collected by the plurality of microphones near a left ear of a user. Then, the noise canceling may be executed using the operation parameter different for each of the sound collection signals (for each environmental noise). Therefore, it is possible to execute the wind sound reduction processing using an appropriate parameter for each of wind sounds detected at different positions (spaces).

Method for Applying Machine Learning

For example, a learning model (discriminator) obtained by machine learning may be used for the wind sound reduction control unit 16.

Figure 10:
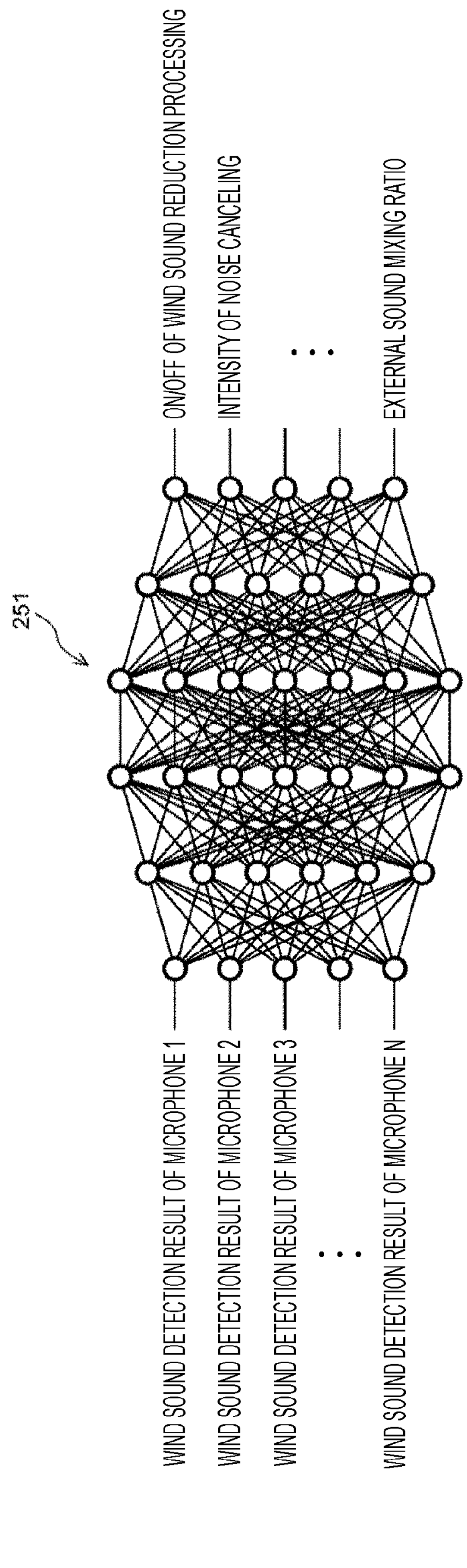
FIG. 10 is a view illustrating an application example of a DNN.

FIG. 10 illustrates an example of the learning model that can be used for the wind sound reduction control unit 16. An example in which the learning model is configured using a DNN 251 is illustrated in this example.

The DNN 251 receives an input of a wind sound detection result for each of microphones provided in the left ear sound collection unit 11L and the right ear sound collection unit 11R. That is, the wind sound detection results based on sound collection signals collected at different positions (spaces) by the microphones are individually input to the DNN 251. In this case, even if a plurality of microphones is provided in at least one of the left ear sound collection unit 11L or the right ear sound collection unit 11R, the wind sound detection results based on the sound collection signals collected by the respective microphones are individually input to the DNN 251 without being integrated.

Meanwhile, the DNN 251 outputs an operation parameter. The operation parameter includes, for example, on/off and an intensity of wind sound reduction processing as described above.

Note that the DNN 251 may generate a parameter used for each signal processing and output an operation parameter including the generated parameter as illustrated in FIG. 10. In this example, the on/off of the wind sound reduction processing, an intensity of noise canceling, an external sound mixing ratio of external sound pickup processing, and the like are included. Then, the signal processing unit 17 executes signal processing using the parameters generated by the DNN 251.

In this case, for example, the DNN 251 may individually generate a parameter for a left ear reproduction signal and a parameter for a right ear reproduction signal. In this case, the parameter for the left ear reproduction signal and the parameter for the right ear reproduction signal are sometimes different.

Note that it is also possible to design and use the wind sound reduction control unit 16 having a function similar to that of the DNN 251 of FIG. 10 without using machine learning.

Modified Example Regarding Signal Processing

Although an example has been described in which the signal processing unit 17 executes feed-forward noise canceling in the above description, the present technology can also be applied to a case where the signal processing unit 17 executes feedback noise canceling. In this case, a microphone for generating a left ear sound collection signal in the left ear sound collection unit 11L is provided at a position close to an ear of a user on the inner side of a casing (a side closer to the ear of the user). Similarly, a microphone for generating a right ear sound collection signal in the right ear sound collection unit 11R is provided at a position close to an ear of the user on the inner side of a casing (a side closer to the ear of the user).

Application Examples

The present technology can also be applied to, for example, an information processing apparatus (for example, an earphone, a hearing aid, or the like) that reproduces and outputs an audio signal for only one of right and left ears.

In this case, for example, only the left ear sound collection unit 11L and the left ear wind sound detection unit 14L or the right ear sound collection unit 11R and the right ear wind sound detection unit 14R are provided. Furthermore, an operation parameter of the wind sound reduction processing is set on the basis of a wind sound detection result of one ear.

Furthermore, the present technology can also be applied to an information processing apparatus (for example, a smartphone, a mobile phone, a voice recognition apparatus, or the like) that executes signal processing on a left ear voice signal and a right ear voice signal that are audio signals corresponding to a voice spoken by a user. For example, the left ear voice signal and the right ear voice signal are transmitted to an information processing apparatus (for example, a smartphone or a mobile phone) or the like of a person at the other end of the line as a call voice, or are used for voice recognition.

In this case, the signal processing such as the beamforming or the noise reduction is performed on the left ear voice signal and the right ear voice signal. Then, for example, in a case where the wind sound reduction processing is set to on, the signal processing unit 17 suppresses the operations of the beamforming and noise reduction. Specifically, for example, in the case where the wind sound reduction processing is set to on, the signal processing unit 17 sets the beamforming and noise reduction to off or lowers the intensities thereof. On the other hand, in a case where the wind sound reduction processing is set to off, the signal processing unit 17 executes the beamforming and noise reduction as usual.

Furthermore, in this case, for example, microphones that collect the left ear voice signal and the right ear voice signal corresponding to the voice of the user are provided separately from the microphones that collect the left ear sound collection signal and the right ear sound collection signal used for the signal processing.

Moreover, for example, the left ear output unit 18L and the right ear output unit 18R are used to output the left ear voice signal and right ear voice signal after the signal processing. Specifically, the left ear output unit 18L and the right ear output unit 18R output the left ear voice signal and right ear voice signal after the signal processing to an apparatus in the subsequent stage or transmit the left ear voice signal and right ear voice signal after the signal processing to the information processing apparatus of the person on the other end of the line.

Note that the present technology can also be applied to an information processing apparatus that outputs only one of a left ear voice signal and a right ear voice signal or outputs a monaural voice signal.

3. Others

Configuration Example of Computer

The above-described series of processing can be executed by hardware or software. In a case where the series of processing is executed by software, a program constituting the software is installed in a computer. Here, the computer includes, a computer incorporated in dedicated hardware, a general-purpose personal computer for example, which is capable of executing various kinds of functions by installing various programs, or the like.

The program executed by the computer can be provided by recording on a removable medium as a package medium and the like, for example. Furthermore, the program can be provided via a wired or wireless transmission medium such as a local area network, the Internet, or digital satellite broadcasting.

Note that the program executed by the computer may be a program for processing in time series in the order described in the present description, or a program for processing in parallel or at a necessary timing such as in a case where a call is made.

Furthermore, in the present specification, a system is intended to mean assembly of a plurality of components (apparatuses, modules (parts) and the like) and it does not matter whether or not all the components are in the same casing. Therefore, a plurality of apparatuses housed in separate casings and connected via a network and one apparatus in which a plurality of modules is housed in one casing are both systems.

Moreover, the embodiments of the present technology are not limited to the above-described embodiments, and various Modified examples can be made without departing from the gist of the present technology.

For example, the present technology may be configured as cloud computing in which a function is shared by a plurality of apparatuses through the network to process together.

Furthermore, each step described in the above-described flowchart can be executed by one apparatus or executed by a plurality of apparatuses in a shared manner.

Moreover, in a case where a plurality of processes is included in one step, the plurality of processes included in one step can be executed by one apparatus or by a plurality of apparatuses in a shared manner.

Combination Examples of Configurations

The present technology can also have the following configurations.

(1)

An information processing apparatus including:

a signal processing unit that executes signal processing on a left ear audio signal and a right ear audio signal; and a wind sound reduction control unit that controls wind sound reduction processing of reducing an influence of a wind sound in the signal processing on the basis of a detection result of the wind sound based on a left ear sound collection signal collected near a left ear of a user and a detection result of the wind sound based on a right ear sound collection signal collected near a right ear of the user.

(2)

The information processing apparatus according to (1), in which the wind sound reduction control unit controls the wind sound reduction processing on the basis of a detection result obtained by integrating the detection result of the wind sound based on the left ear sound collection signal and the detection result of the wind sound based on the right ear sound collection signal.

(3)

The information processing apparatus according to (2), in which the wind sound reduction control unit causes the signal processing unit to execute the wind sound reduction processing in a period in which the wind sound is detected on the basis of the left ear sound collection signal and the wind sound is detected on the basis of the right ear sound collection signal.

(4)

The information processing apparatus according to any one of (1) to (3), further including:

a left ear wind sound detection unit that detects the wind sound on the basis of the left ear sound collection signal; and a right ear wind sound detection unit that detects the wind sound on the basis of the right ear sound collection signal.

(5)

The information processing apparatus according to (4), further including:

a left ear sound collection unit that collects a sound near the left ear of the user and generates the left ear sound collection signal; and a right ear sound collection unit that collects a sound near the right ear of the user and generates the right ear sound collection signal.

(6)

The information processing apparatus according to (5), in which at least one of the left ear sound collection unit or the right ear sound collection unit generates a plurality of sound collection signals using a plurality of microphones, and at least one of the left ear wind sound detection unit or the right ear wind sound detection unit detects the wind sound on the basis of the plurality of sound collection signals.

(7)

The information processing apparatus according to (6), in which at least one of the left ear wind sound detection unit or the right ear wind sound detection unit detects the wind sound for each of the sound collection signals, and the wind sound reduction control unit controls the wind sound reduction processing for each of the sound collection signals on the basis of a detection result of the wind sound for each of the sound collection signals.

(8)

The information processing apparatus according to any one of (4) to (7), in which the left ear wind sound detection unit and the right ear wind sound detection unit perform wind sound detection processing for each predetermined time length.

(9)

The information processing apparatus according to any one of (4) to (8), in which the left ear wind sound detection unit detects left ear accompanying information that is information regarding the wind sound on the basis of the left ear sound collection signal, the right ear wind sound detection unit detects right ear accompanying information that is information regarding the wind sound on the basis of the right ear sound collection signal, and the wind sound reduction control unit controls the wind sound reduction processing on the basis of the detection result of the wind sound based on the left ear sound collection signal, the left ear accompanying information, the detection result of the wind sound based on the right ear sound collection signal, and the right ear accompanying information.

(10)

The information processing apparatus according to any one of (1) to (9), in which the signal processing unit reduces the influence of the wind sound by suppressing an operation of the signal processing.

(11)

The information processing apparatus according to (10), in which the wind sound reduction control unit controls at least one of on/off of the wind sound reduction processing, an intensity of the wind sound reduction processing, a timing to activate the wind sound reduction processing, or a change rate of the intensity of the wind sound reduction processing.

(12)

The information processing apparatus according to (11), further including a setting unit that sets at least one of on/off, an intensity, a sensitivity, or a transition time of a wind sound reduction function that implements the wind sound reduction processing on the basis of at least one of a user setting or a predicted wind sound situation, in which the wind sound reduction control unit controls the on/off of the wind sound reduction processing on the basis of the on/off of the wind sound reduction function, controls the intensity of the wind sound reduction processing on the basis of the intensity of the wind sound reduction function, controls the timing to activate the wind sound reduction processing on the basis of the sensitivity of the wind sound reduction function, and controls the change rate of the intensity of the wind sound reduction processing on the basis of the transition time of the wind sound reduction function.

(13)

The information processing apparatus according to any one of (10) to (12), in which the left ear audio signal corresponds to a sound input to the left ear of the user, the right ear audio signal corresponds to a sound input to the right ear of the user, and the signal processing is at least one of noise canceling, external sound pickup, beamforming, or noise reduction.

(14)

The information processing apparatus according to (13), further including:

a left ear output unit that outputs a sound based on the left ear audio signal after the signal processing; and a right ear output unit that outputs a sound based on the right ear audio signal after the signal processing.

(15)

The information processing apparatus according to any one of (10) to (12), in which the left ear audio signal and the right ear audio signal are obtained by collecting a voice of the user, and the signal processing is at least one of beamforming or noise reduction.

(16)

The information processing apparatus according to (1) to (15), in which the wind sound reduction control unit generates a parameter to be used for the signal processing on the basis of the detection result of the wind sound based on the left ear sound collection signal and the detection result of the wind sound based on the right ear sound collection signal, and the signal processing unit executes the signal processing using the parameter.

(17)

The information processing apparatus according to any one of (1) to (16), in which the wind sound reduction control unit controls the wind sound reduction processing for each of a plurality of frequency bands of the left ear audio signal and the right ear audio signal.

(18)

An information processing method including:

executing signal processing on a left ear audio signal and a right ear audio signal; and controlling wind sound reduction processing of reducing an influence of a wind sound in the signal processing on the basis of a detection result of the wind sound based on a left ear sound collection signal collected near a left ear of a user and a detection result of the wind sound based on a right ear sound collection signal collected near a right ear of the user.

(19)

A program for causing a computer to execute processing of:

executing signal processing on a left ear audio signal and a right ear audio signal; and controlling wind sound reduction processing of reducing an influence of a wind sound in the signal processing on the basis of a detection result of the wind sound based on a left ear sound collection signal collected near a left ear of a user and a detection result of the wind sound based on a right ear sound collection signal collected near a right ear of the user.

(20)

An information processing apparatus including:

a signal processing unit that executes predetermined signal processing on an audio signal for one ear of a left ear and a right ear; and a wind sound reduction control unit that controls wind sound reduction processing of reducing an influence of a wind sound in the signal processing on the basis of a detection result of the wind sound based on a sound collection signal collected near the one ear.

Note that the effects described in the present specification are merely examples and are not limited, and other effects may be provided.

REFERENCE SIGNS LIST

1 Information processing apparatus
11L Left ear sound collection unit
11R Right ear sound collection unit
13 Setting unit

14 Wind sound detection unit
14L Left ear wind sound detection unit
14R Right ear wind sound detection unit
15 Operation control unit
17 Signal processing unit
18L Left ear reproduction unit
18R Right ear reproduction unit
201 External device
251 DNN

The invention claimed is:

1. An information processing apparatus, comprising:

a signal processing unit configured to execute a signal process on a left ear audio signal and a right ear audio signal;

a setting unit configured to set a first parameter of a wind sound reduction function based on a wind sound situation around the information processing apparatus;

a left ear wind sound detection unit configured to detect a first wind sound, based on a left ear sound collection signal and the set first parameter of the wind sound reduction function, wherein the left ear sound collection signal corresponds to a signal in a vicinity of a left ear of a user;

a right ear wind sound detection unit configured to detect a second wind sound, based on a right ear sound collection signal and the set first parameter of the wind sound reduction function, wherein the right ear sound collection signal corresponds to a signal in a vicinity of a right ear of the user; and a wind sound reduction control unit configured to control a wind sound reduction process, wherein the wind sound reduction process corresponds to a reduction of an influence of the detected first wind sound and the detected second wind sound in the signal process, and the wind sound reduction process is controlled based on the detection of the first wind sound and the detection of the second wind sound.

2. The information processing apparatus according to claim 1, wherein the wind sound reduction control unit is further configured to:

integrate a first detection result and a second detection result, wherein the first detection result indicates the detection of the first wind sound, and the second detection result indicates the detection of the second wind sound; and control the wind sound reduction process based on the integration.

3. The information processing apparatus according to claim 2, wherein the wind sound reduction control unit is further configured to cause the signal processing unit to execute the wind sound reduction process in a period, the first detection result indicates the detection of the first wind sound in the period, and the second detection result indicates the detection of the second wind sound in the period.

4. The information processing apparatus according to claim 1, further comprising:

a left ear sound collection unit configured to:

collect a third sound in the vicinity of the left ear of the user; and generate the left ear sound collection signal based on the collected third sound; and a right ear sound collection unit configured to:

collect a fourth sound in the vicinity of the right ear of the user; and generate the right ear sound collection signal based on the collected fourth sound.

5. The information processing apparatus according to claim 4, wherein at least one of the left ear sound collection unit or the right ear sound collection unit is further configured to generate a plurality of sound collection signals via a plurality of microphones, the plurality of sound collection signals includes at least one of the generated left ear sound collection signal or the generated right ear sound collection signal, at least one of the left ear wind sound detection unit or the right ear wind sound detection unit is further configured to detect a plurality of wind sounds based on the generated plurality of sound collection signals, and the detected plurality of wind sounds includes at least one of the detected first wind sound and the detected second wind sound.

6. The information processing apparatus according to claim 5, wherein the detection of each of the plurality of wind sounds corresponds to a respective sound collection signal of the generated plurality of sound collection signals, the wind sound reduction control unit is further configured to control the wind sound reduction process for each of the generated plurality of sound collection signals, and the wind sound reduction process for each of the generated plurality of sound collection signals is controlled based on a respective wind sound of the detected plurality of wind sounds.

7. The information processing apparatus according to claim 1 wherein each of the left ear wind sound detection unit and the right ear wind sound detection unit is further configured to perform a wind sound detection process for each of a plurality of specific time lengths, and the plurality of specific time lengths are same.

8. The information processing apparatus according to claim 1, wherein the left ear wind sound detection unit is further configured to detect left ear accompanying information based on the left ear sound collection signal, the left ear accompanying information is information related to the first wind sound, the right ear wind sound detection unit is further configured to detect right ear accompanying information based on the right ear sound collection signal, the right ear accompanying information is information related to the second wind sound, and the wind sound reduction control unit is further configured to control the wind sound reduction process based on the detection of the first wind sound, the left ear accompanying information, the detection of the second wind sound, and the right ear accompanying information.

9. The information processing apparatus according to claim 1, wherein the signal processing unit is further configured to reduce the influence, of the detected first wind sound and the detected second wind sound, based on suppression of an operation of the signal process.

10. The information processing apparatus according to claim 9, wherein the wind sound reduction control unit is further configured to control at least one of:

an on/off of the wind sound reduction process, an intensity of the wind sound reduction process, a time to activate the wind sound reduction process, or a change rate of the intensity of the wind sound reduction process.

11. The information processing apparatus according to claim 10, wherein the setting unit is further configured to set the first parameter of the wind sound reduction function based on a user input, the first parameter of the wind sound reduction function includes at least one of an on/off of the wind sound reduction function, an intensity of the wind sound reduction function, a sensitivity of the wind sound reduction function, or a transition time of the wind sound reduction function, and the wind sound reduction control unit is further configured to:

control the on/off of the wind sound reduction process based on the on/off of the wind sound reduction function;

control the intensity of the wind sound reduction process based on the intensity of the wind sound reduction function;

control, based on the sensitivity of the wind sound reduction function, the time to activate the wind sound reduction process; and control the change rate of the intensity of the wind sound reduction process based on the transition time of the wind sound reduction function.

12. The information processing apparatus according to claim 9, wherein the left ear audio signal corresponds to a sound at the left ear of the user, the right ear audio signal corresponds to a sound at the right ear of the user, and the signal process is at least one of a noise canceling process, an external sound pickup process, a beamforming process, or a noise reduction process.

13. The information processing apparatus according to claim 12, further comprising:

a left ear output unit configured to output a third sound subsequent to the signal process, wherein the third sound is outputted based on the left ear audio signal; and a right ear output unit configured to output a fourth sound subsequent to the signal process, wherein the fourth sound is outputted based on the right ear audio signal.

14. The information processing apparatus according to claim 9, wherein the left ear audio signal and the right ear audio signal correspond to a voice of the user, and the signal process is at least one of a beamforming process or a noise reduction process.

15. The information processing apparatus according to claim 1, wherein the wind sound reduction control unit is further configured to generate a second parameter for the signal process, the second parameter for the signal process is generated based on the detection of the first wind sound and the detection of the second wind sound, and the signal processing unit is further configured to execute the signal process based on the second parameter for the signal process.

16. The information processing apparatus according to claim 1, wherein the wind sound reduction control unit is further configured to control the wind sound reduction process for each of a plurality of first frequency bands of the left ear audio signal and for each of a plurality of second frequency bands of the right ear audio signal.

17. An information processing method, comprising:

executing a signal process on a left ear audio signal and a right ear audio signal;

setting a parameter of a wind sound reduction function based on a wind sound situation around an information processing apparatus;

detecting a first wind sound based on a left ear sound collection signal and the set parameter of the wind sound reduction function, wherein the left ear sound collection signal corresponds to a signal in a vicinity of a left ear of a user;

detecting a second wind sound based on a right ear sound collection signal and the set parameter of the wind sound reduction function, wherein the right ear sound collection signal corresponds to a signal in a vicinity of a right ear of the user; and controlling a wind sound reduction process, wherein the wind sound reduction process corresponds to a reduction of an influence of the detected first wind sound and the detected second wind sound in the signal process, and the wind sound reduction process is controlled based on the detection of the first wind sound and the detection of the second wind sound.

18. A non-transitory computer-readable medium having stored thereon, computer-executable instructions that when executed by a computer, causes the computer to execute operations, the operations comprising:

executing a signal process on a left ear audio signal and a right ear audio signal;

setting a parameter of a wind sound reduction function based on a wind sound situation around an information processing apparatus;

detecting a first wind sound based on a left ear sound collection signal and the set parameter of the wind sound reduction function, wherein the left ear sound collection signal corresponds to a signal in a vicinity of a left ear of a user:

detecting a second wind sound based on a right ear sound collection signal and the set parameter of the wind sound reduction function, wherein the right ear sound collection signal corresponds to a signal in a vicinity of a right ear of the user; and controlling a wind sound reduction process, wherein the wind sound reduction process corresponds to a reduction of an influence of the detected first wind sound and the detected second wind sound in the signal process, and the wind sound reduction process is controlled based on the detection of the first wind sound and the detection of the second wind sound.

19. An information processing apparatus, comprising:

a signal processing unit configured to execute a specific signal process on one of a left ear audio signal and a right ear audio signal;

a setting unit configured to set a parameter of a wind sound reduction function based on a wind sound situation around the information processing apparatus;

one of a left ear wind sound detection unit or a right ear wind sound detection unit configured to detect a wind sound, based on the set parameter of the wind sound reduction function and one of a left ear sound collection signal or a right ear sound collection signal, respectively, wherein the left ear sound collection signal corresponds to a signal in a vicinity of a left ear of a user, and
the right ear sound collection signal corresponds to a signal in a vicinity of a right ear of the user; and
a wind sound reduction control unit configured to control a wind sound reduction process, wherein
the wind sound reduction process corresponds to a reduction of an influence of the detected wind sound in the specific signal process, and
the wind sound reduction process is controlled based on the detected wind sound.

* * * * *